J. BROPSON.
SINK STRAINER.
APPLICATION FILED FEB. 23, 1909.

972,676.

Patented Oct. 11, 1910.

Witnesses
Inventor
James Bropson
by Wm. M. Homer
Attorney

UNITED STATES PATENT OFFICE.

JAMES BROPSON, OF CLEVELAND, OHIO.

SINK-STRAINER.

972,676.   Specification of Letters Patent.   Patented Oct. 11, 1910.

Application filed February 23, 1909. Serial No. 479,588.

*To all whom it may concern:*

Be it known that I, JAMES BROPSON, a citizen of the United States, and resident of Cleveland, in the county of Cuyahoga and State of Ohio, have invented certain new and useful Improvements in Sink-Strainers, of which I hereby declare the following to be a full, clear, and exact description, such as will enable others skilled in the art to which it appertains to make and use the same.

The objects of the invention are to provide a form of sink strainer having the following advantages and features of improved efficiency and practicability in the art.

Heretofore sink strainers inserted in the bottom of the sink have been attached thereto with bolts, which after a time become loosened and leakage results. Again the strainer being horizontal and sunk in a recess the enamel coating of the sink becomes cracked and worn around the edges of the recess exposing the iron which soon rusts away. This wearing and chipping of the enamel is due to the scraping action of dishes and kitchen utensils placed thereon, and can not be avoided so long as the strainer is placed in that position.

The improved strainer herein described is placed in a suitable discharge opening located in the relatively vertical side or end of the sink for that purpose, and hence permits of a perfectly smooth surface for the sink bottom, and the strainer is also partially concealed from view. No fastening bolts of any kind are required, so that there is no danger of leakage from bolts rusting out or wearing loose. The strainer itself is not exposed to wear and being nearly vertical in position will not become scratched and disfigured if made of nickel or otherwise nicely finished. Therefore a strainer has been designed with projecting edges adapted to cover the chipped and worn portions of the sink, but this danger is wholly obviated by the improved device.

The invention comprises the hollow outlet portion adapted to project on the exterior of the sink, and communicating with the interior of the sink by means of an opening of any desired shape or size, and the strainer plate adapted to interlock with the walls of this opening so that it can not be removed by ordinary usage. A fastening device such as a screw can also be used to secure the parts together. Beneath this hood or outlet portion, is secured a nozzle, adapted to communicate with and to discharge into the piping or trap below.

The invention further comprises the combination and arrangement of parts, hereinafter described shown in the accompanying drawings and specifically pointed out in the claims.

Figure 1:
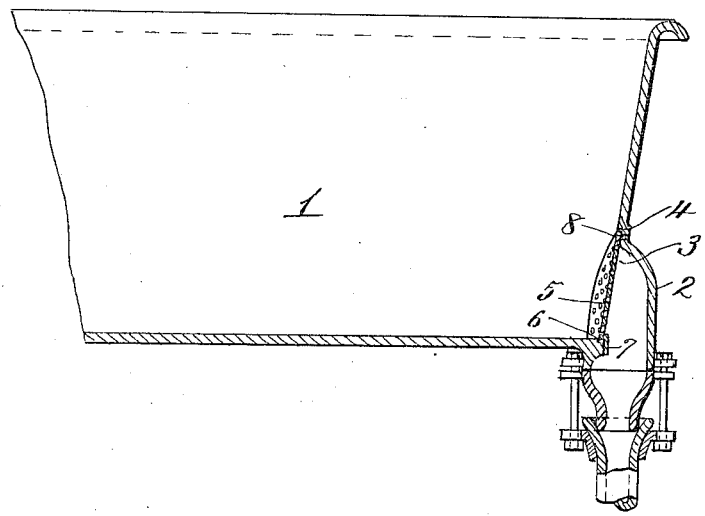
Figure 2:
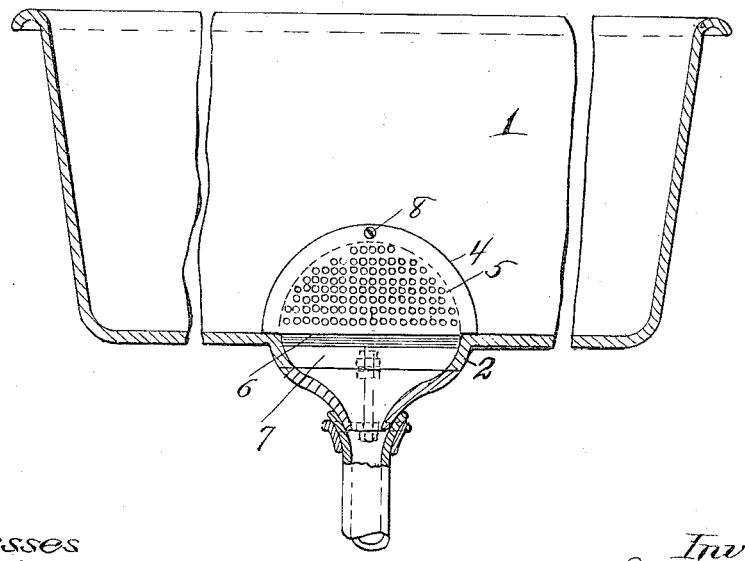

In the accompanying drawings Figure 1 is a longitudinal section of the sink, and strainer showing the various parts in their relations to each other. Fig. 2 is a transverse section of the same.

In these views 1 is the sink.

2 is the outlet portion or hood preferably integral with the body of the sink, and extending downwardly below the sink bottom. An opening 3 communicates with the interior of the sink. The upper and side edges of this opening are recessed at 4, 4, and in this recess rest the corresponding edges of the strainer plate, 5. The lower edge of the strainer plate is provided with a shoulder 6 which rests upon the lower horizontal edge of the opening 3, and the lower edge of this plate is inserted in the opening and rests against the vertical edge thereof at 7. In this manner the strainer plate is locked in the opening 3. A screw 8 can also be used to prevent any possible displacement.

This device is simple and efficient and is not in a position to wear out and does not detract from the appearance of the sink or roughen the bottom in any way.

Having described the invention what I claim as new and desire to secure by Letters Patent is:

1. In combination with an enameled sink, an integral hood outlet opening communicating with the interior of the sink, having its lower edge on the level of the bottom, and having a reduced opening and a substantially vertical strainer plate having its upper and side edges sunk in the walls of the sink, a shoulder in its lower edge adapted to rest on the horizontal portion of the sink bottom and a depending edge for said strainer plate adapted to be inserted in said outlet opening exterior to the bottom of said sink, whereby said strainer plate is removed from abrasion.

2. The combination with an enameled sink having side and bottom walls, and a laterally extending opening in one of the said walls said opening having its lower edge on a level with the bottom, the upper and side edges of said opening being recessed, a vertical strainer plate in said opening the edges of said strainer plate adapted to rest in said recessed edges of said opening, an interlocking vertical portion at the lower edge of said strainer plate adapted to engage the inner side of the vertical portion of the lower edge of said opening, whereby the said strainer is wholly sunk within the vertical walls of said sink, and a hood extending downwardly and outwardly from said sink and provided with a reduced outlet opening, said hood adapted to communicate with the said opening in the wall of the sink, and of the full width of said strainer opening, the rear wall of said hood being vertical and the side walls of the strainer in shape corresponding to the opening.

In testimony whereof, I hereunto set my hand this 5th day of February 1909.

JAMES BROPSON.

In presence of—
GEO. S. COLE,
WM. M. MONROE.